July 5, 1966 W. N. TORPEY 3,259,566
METHOD OF ANAEROBIC DIGESTION OF SEWAGE SLUDGE
Filed Aug. 7, 1962 7 Sheets-Sheet 1

INVENTOR.
WILBUR N. TORPEY
BY Theodore M. Jablon
ATTORNEY

July 5, 1966 W. N. TORPEY 3,259,566
METHOD OF ANAEROBIC DIGESTION OF SEWAGE SLUDGE
Filed Aug. 7, 1962 7 Sheets-Sheet 2

*INVENTOR.*
WILBUR N. TORPEY
BY
*Theodore M. Jablon*
ATTORNEY

FIG. 3 Proportional Gas Loss and Digestion Index vs. Loading Rates for Digestion of Concentrated Primary and Activated Sludge

Conventional Two-Stage Digestion
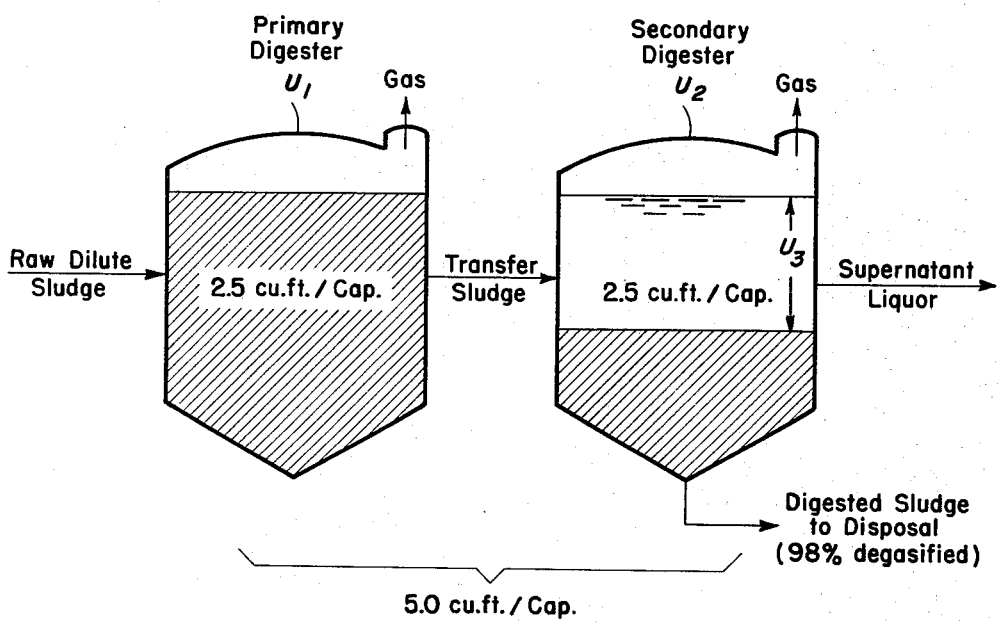
Fig. 5.
High Rate Digestion
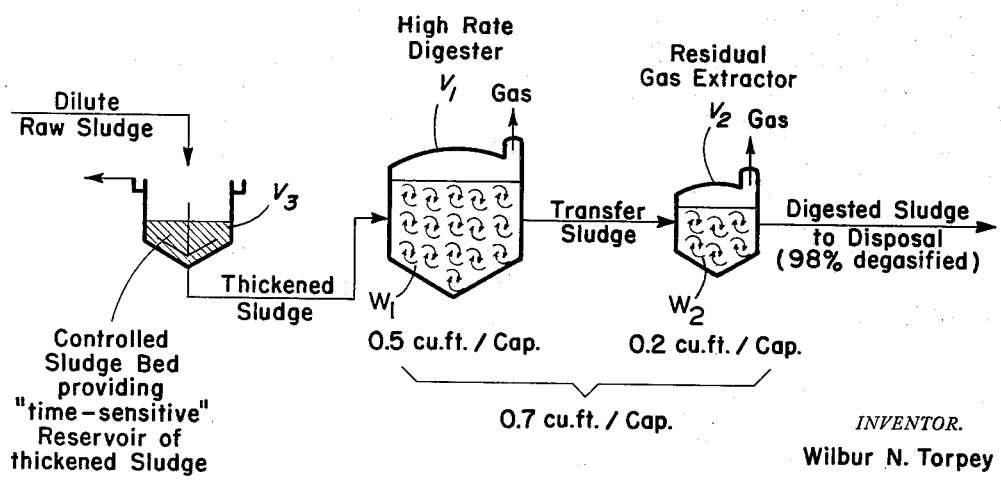
INVENTOR.
Wilbur N. Torpey

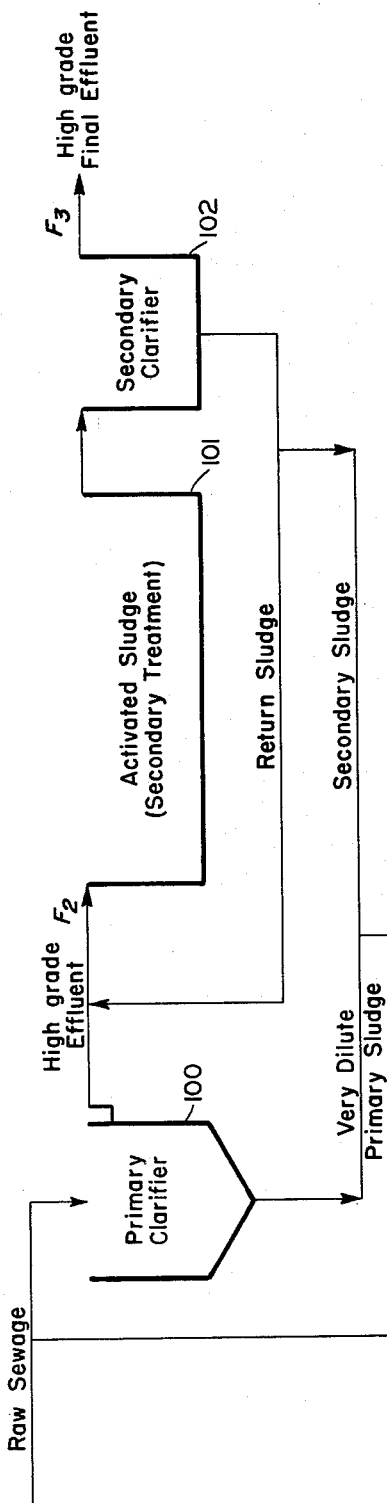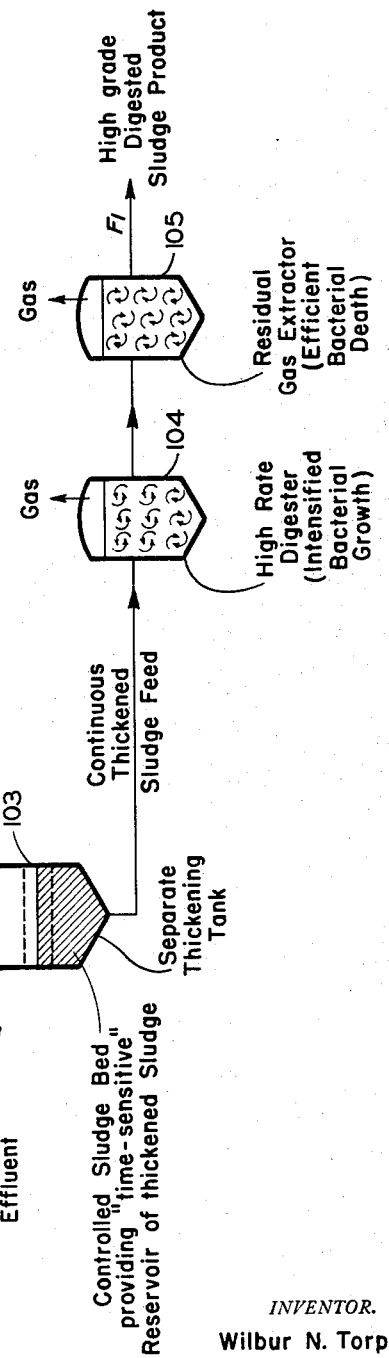
Fig. 6.

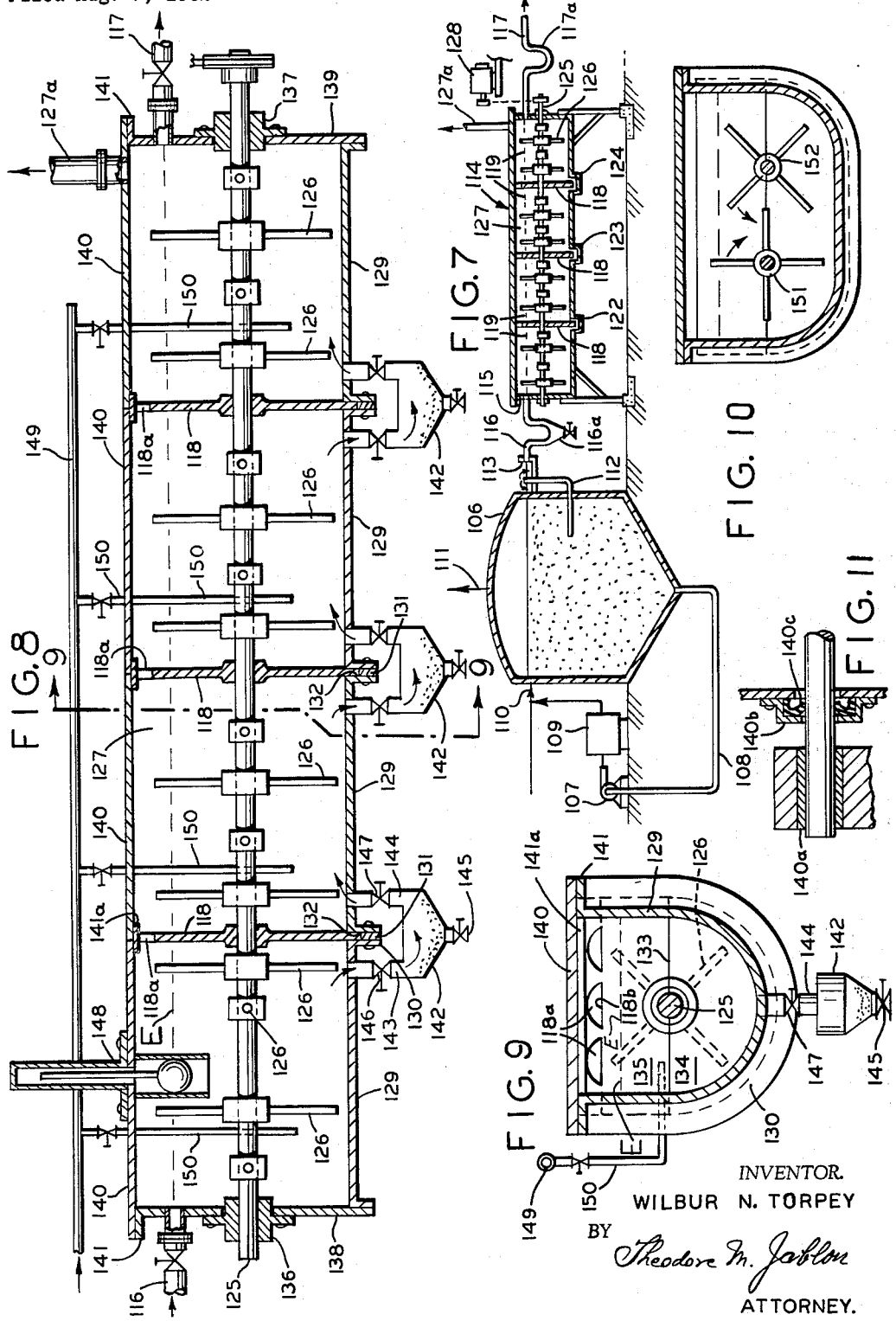

3,259,566
METHOD OF ANAEROBIC DIGESTION OF SEWAGE SLUDGE
Wilbur N. Torpey, 49—23 Hanford St., Douglaston 62, New York, N.Y.
Filed Aug. 7, 1962, Ser. No. 215,461
9 Claims. (Cl. 210—10)

This application is a continuation-in-part of my application Ser. No. 563,581, filed Feb. 6, 1956, now abandoned, which in turn was a continuation-in-part of parent application Ser. No. 388,491, filed Oct. 27, 1953, now abandoned.

This invention relates to improvements in the treatment of raw sewage sludges by so-called anaerobic digestion to convert putrescible sewage matter into gas, while producing an inoffensive residue called digested sludge.

A conventionally operated digester yields not only digested sludge from the bottom, and gas from the top, but also yields digester supernatant liquor from the top, which supernatant must be retreated by recirculation through the plant treatment system. The producing of a supernatant of acceptable quality from conventional digestion systems and its treatment in customary plant practice present special problems such as will be pointed out further below.

It is among the objects of this invention to improve the efficiency and the economy of present day digestion practice in terms of reducing the requirements for digester tank volume with significantly high savings in the costs of tank construction, land area required, as well as savings in heating cost for maintaining requisite digestion temperatures. Another object is to improve overall operating efficiency of the sewage treatment plant.

Briefly, the objects of this invention are attainable by eliminating the digester supernatant liquor problem, while imposing extraordinarily high solids loading rates upon the digester continuously. This invention revolves about the discovery that the digestion or conversion of solids to gas is operationally attainable and sustainable in only a small fraction of the time heretofore found to be necessary and required for conventional digestion. This invention exploits and implements the discovery that digestion is dynamically sustainable so as to take place not in a period of months of detention time as heretofore found to be necessary and officially required, but to take place within a period of hours if conducted and controlled under a combination of conditions and in the manner set forth in detail further below. In exploiting and implementing that discovery of the invention, provision is made for controlling the digestion in a manner oriented with respect to the limit of biological failure occurring under extreme continuous loading rates rather than oriented with respect to the sludge detention times in the digester as governed by the problem of producing digester supernatant liquor.

We speak of a digestion system in general as performing its task if it stabilizes the digestible solids by their conversion into gas and alkaline reaction products, while separating supernatant liquor so as to reduce the volume of sludge to a minimum for further disposition.

Digester capacity determinations are usually expressed in terms of cubic feet of digester volume needed per capita of connected population, 2 cubic feet per capita being an average requirement for the digestion of primary sludge, while 5 cubic feet per capita is the usual requirement for the digestion of primary and secondary activated sludge if modern two-stage digestion is employed.

In conventional sewage treatment operations, raw sludge from the clarification treatment section is relatively highly dilute and varying in concentration and volume because of the manner in which the primary clarifier must be operated, such difficulty being partly due to diurnal changes in the supply, and partly because of the basic inability of the clarifier to perform the dual function of concentrating the sludge as well as retaining a maximum of solids. Therefore, the sludge from the primary clarifier is usually drawn only periodically or batchwise to avoid too high a dilution. If it were to be drawn continuously or near-continuously, the sludge concentration would vary between dilute sludge and raw sewage. To meet this dilemma in clarifier operation the conventional digester tank is made large enough to enable it to absorb such fluctuations without upsetting the biological function and without deterioration of the supernatant liquor quality. Thus, a very large and uneconomical digester tank has had to be accepted for the sake of providing operational stability in the digester contents so that the functioning or operation of the digester itself might remain stable and balanced in spite of supply fluctuations.

A relatively good quality of supernatant is obtainable from a conventional digestion system only by accepting a slow-down of the digester activity, to suppress gas formation in the digesting sludge, since a more intense gas formation by its agitating effects deteriorates the quality of the supernatant. Therefore, digesters are constructed so large that the conversion of solids to gas take place at such a slow rate that the tanks concurrently perform the dual function of digesting the sludge and separating the digested sludge solids from the liquor (digester supernatant). Such attempts at compromise present the difficulty of achieving two contradictory objectives, namely, well-digesting of the sludge while settling the solids to produce clear supernatant liquor. The effectiveness of the one function is increased only at the expense of the other, and vice versa. That is to say, the digester tankage customarily contains at any one time a backlog of undigested gasifiable matter fresh as well as aged, with the rate of digestion being sufficiently moderate to permit the release of an acceptable quality supernatant. Hence, this production of supernatant is attained at the price of low tank efficiency and low digestion efficiency.

Because of the necessity of carrying a large burden of water into the digestion process itself, it is encumbent upon present day practice (a) to remove that liquid burden from the system as supernatant, (b) to treat such supernatant, (c) to provide the amount of fuel or heat energy requisite for heating those large volumes of raw sludge fed to the digester and maintain desired digestion temperatures over and above the radiation losses of the large tanks, (d) to maintain the alkalinity level above a critical minimum.

To cope with the supernatant problem, so-called two-stage digestion is now widely used, since it separates the function of gas production from the function of releasing supernatant liquor. That is to say, two-stage digestion provides primary and secondary digester tanks operating in series. Raw sludge is fed to the primary tank at the aforementioned diurnally varying rates and concentrations, the tank being so large as to absorb such fluctuations while providing digestive operational stability and load shock resistance. No attempt is made to derive supernatant liquor from the primary digester tank; rather, there are maintained in the primary digestion stage a favorable digestion temperature and a favorable pH while only a small proportion of digestible matter is carried over to the second stage in order to avoid deterioration of the supernatant liquor. Therefore, the volume provided by the primary digester tank should be ample enough to transfer to the secondary digestion stage a sludge containing an amount of residual gasifiable matter sufficiently small to allow supernatant liquor to be released as undisturbed as is possible from the secondary stage or tank.

In the operation of conventional two-stage digestion it is important that the solids concentration in the raw sludge feed be maintained within such limits that it is neither too high nor too low. If the concentration were too high it will deteriorate the quality of the supernatant liquor thereby rendering the secondary stage useless; if the concentration were too dilute the alkalinity concentration will be lowered, the pH will be depressed, the environment will be rendered biologically unfavorable so that the primary digestion stage will fail.

Present day practice provides for the secondary digester tank to be about equal in volume to the primary digester tank, with the primary tank carrying most of the burden of digestion and no supernatant liquor is derived therefrom, while the secondary tank allows supernatant liquor to be released from the digesting sludge. Primary digester sludge is about 90% digested before transfer to the secondary digester tank, where it undergoes slow-rate digestion concurrently with the release of digester supernatant. A nearly fully digested sludge shrunk in volume is thus produced from this two-stage digestion system.

These two-stage digestion systems, so designed, work remarkably well for extended periods without interruption. Their great operation stability is attained by constructing the tanks so very large relative to the load. Indeed, it would be difficult to upset these systems from a biological standpoint except by the addition of highly toxic substances, by cooling off the contents or by unreasonably high dilution of the raw sludge feed with consequent excessive loss of alkalinity concentrations.

Two-stage digestion accomplishes its objectives very well and with excellent regularity although the secondary systems are sensitive and vulnerable to upsets with respect to the quality of the supernatant liquor.

In view of such accepted two-stage digestion practice, it is an object of this invention to provide a digestion process capable of producing a digested sludge equally well degassed and stabilized as well as equally concentrated. It is a concurrent object to eliminate the operational problems of supernatant liquor that govern conventional operation.

Pilot plant tests in accordance with this invention have shown that the required digester tank volume may be lowered to a point corresponding to say, only .15 cubic foot per capita of digester tank volume as compared with the conventional 5.0 cubic feet per capita tankage required by present day two-stage digestion practice for digestion of a mixture of primary and activated sludge.

This invention involves the discovery that extraordinarily high speeds of bacterial conversion of solids to gas can be effected and be maintained in continuous operation in a digester, far beyond the apparent conversion speeds that must be accepted in a conventional two-stage digestion system. This invention so represents a departure from the two-stage digestion practice and thus from the practice where operational stability and shock load resistance must be accounted for in terms of huge tank sizes.

This invention utilizes this discovery of high rates of solids conversion by significantly increasing the solids loading rates on the digester far beyond the conventional limits imposed by the requirement of producing a sludge thickened to the extent that potentially releasable supernatant liquor does not enter the digester. At the same time, provision is made for continuously maintaining the gasifiable sewage solids substantially uniform throughout the contents of the digester, so that the digested sludge being continuously displaced is substantially representative of the contents of the tank.

It should be pointed out in this connection that those skilled in the art prior to this invention believed that digestion was responsible for the release of water from the sewage solids and the consequent formation of supernatant liquor, whereas the invention utilizes the discovery that raw sludge can be dewatered under specially controlled conditions such as pointed out below.

In order to provide the required high raw sludge concentration to the digester continuously or at high frequencies there is functionally interposed between the clarification system and the digestion system a raw sludge thickening stage the operation of which is conducted in the manner disclosed and described in copending patent application Serial No. 540,866, filed October 17, 1955, now Patent No. 2,850,449, as outlined further below. Suffice it here to say that the thickening operation is conducted so that a sludge bed is formed and maintained in a manner to provide a reservoir from which to withdraw continuously a raw sludge of the solids concentration required as well as providing an operational cushion between the preceding clarification station and the subsequent digestion station. Since for the purpose of such thickening clarifier sludge is drawn extraordinarily dilute, primary effluent is improved with consequent improvement of treatment plant overall efficiency. This contributes importantly to improving overall plant performance since by this thickening operation the supernatant problem is eliminated.

In the absence of the prior limitations imposed by the necessity of having to release supernatant liquor it becomes possible to increase the solids loading rates in direct relation to the rate of speed of biochemical conversion. That is to say, the loading rate can now be increased, limited only by the gas loss incurred in the displaced sludge and by that extreme loading rate at which biological failure takes place. The control of this process of sludge digestion thus is oriented towards such loading rate limits and not towards the production of supernatant liquor.

Under such conditions of sustained high efficiency digestion there is producible a concentrated digested sludge which is disposable inasmuch as a high proportion of its gasifiable matter has been converted to gas.

This invention further proposes to efficiently reduce the residual gasifiable matter present in the concentrated partially digested sludge being continuously displaced from the digester. In such instance relatively greater gas losses can be accepted from the high rate digester at a further saving in digester tank volume by providing a separate chamber or residual gas extractor wherein residual gasifiable matter is converted under high efficiency. That is to say, as the sludge passes through such a supplemental chamber, the contents are maintained in a state of agitation and substantial uniform distribution, in order that such residual digestion may also proceed at the highest efficiency.

In this way, there is established a new digestion system in which the digester is operated so as to continuously sustain high rates of conversion, whereas the residual gasifiable matter is converted in the residual gas extractor under conditions of agitation and uniform distribution so that residual matter will be converted continuously in a minimum of tank volume.

As this invention may be embodied in several forms without departing from the spirit or essential characteristics thereof, the present embodiment is therefore illustrative and not restrictive, since the scope of the invention is defined by the appended claims rather than by the descriptive preceding them, and all changes that fall within the metes and bounds of the claims, or of forms FIGURE 1 is a flowsheet of a sewage treatment plant embodying the process of this invention, where primary and secondary clarifier sludge are passed to a special thickening station, prior to the high-rate digestion operation;

Figure 1:
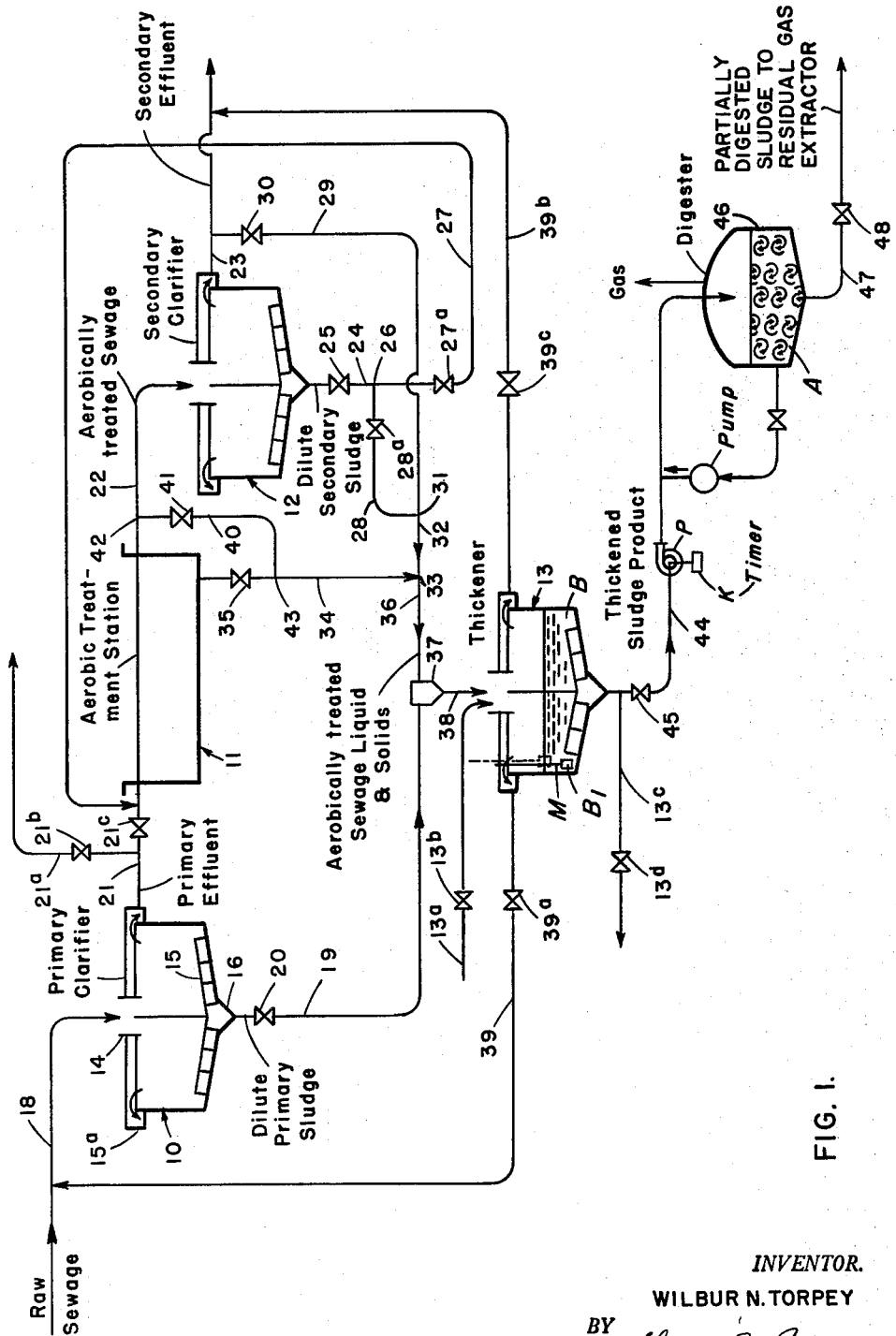
Figure 4:
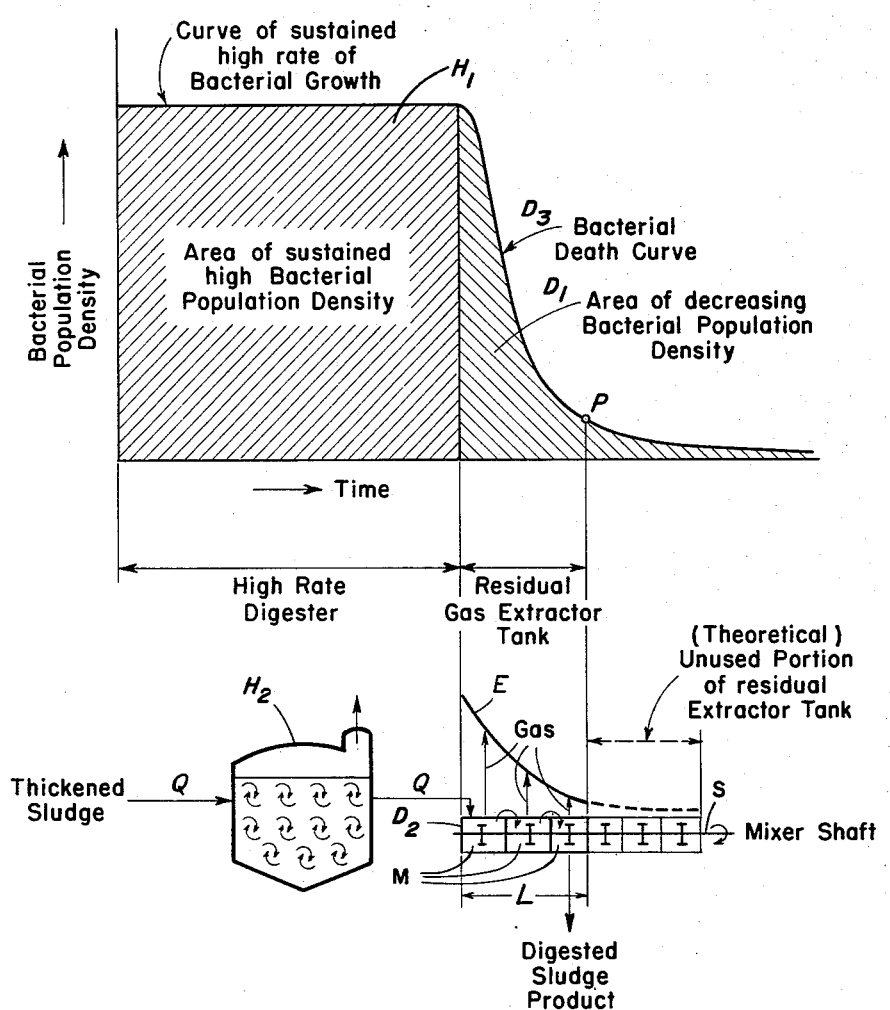
FIGURE 4 illustrates the combination of high rate digester with the residual gas extraction tank, and their respective biological functions.

FIGURE 5 schematically illustrates the relative tank size requirements of high-rate digestion and conventional two-stage digestion;

FIGURE 6 is a simplified flowsheet of the FIGURE 1 treatment plant employing the digestion process of this invention;

FIGURE 7 shows the diagrammatic apparatus arrangement of FIGURE 4 more fully implemented although semi-diagrammatic, including communicating connections between the compartments of the residual gas extraction tank;

FIGURE 8 is an enlarged longitudinal sectional view of the residual gas extraction tank of FIGURE 7, further implemented;

FIGURE 9 is a cross-sectional view taken on line 9—9 of the residual gas extraction tank of FIGURE 8 with the agitator shaft arrangement;

FIGURE 10 is a cross-section of a modified form of the residual gas extraction tank, featuring a pair of parallel agitator shafts; and FIGURE 11 shows a special end bearing arrangement for the agitator shaft.

The FIGURE 1 flowsheet comprises a primary clarifier tank 10, an aerobic treatment station 11, a secondary clarifier tank 12, and a thickener 13. The primary clarifier tank 10 is diagrammatically shown to be of the well-known continuous operating type which has a feedwell 14, a rotary raking structure 15, an effluent overflow launder 15a, and an underflow or sludge discharge cone 16. The secondary clarifier tank 12 as well as the thickener tank 13 similarly may comprise a feedwell, a raking structure, an effluent launder, and a sludge discharge cone.

Raw sewage is supplied to the primary clarifier tank 10 by feed conduit 18 leading to the feedwell 14 of the clarifier. Dilute primary clarifier sludge discharges by way of a primary sludge conduit 19 having a control valve 20. Primary effluent carrying a suspension of as yet non-settleable solids passes through a conduit 21 leading from the primary effluent launder 15a to the aerobic treatment station 11 here shown to be in the form of an aerating tank, although it may be another form of biological treatment apparatus for example, a so-called biofilter, whereby the desired aerobic treatment of the primary effluent is achieved.

Aerobically treated sewage passes from the aerating station 11 through a conduit 22 to the feedwell of the secondary clarifier tank 12. An overflow discharge conduit 23 passes secondary effluent from the effluent launder of that tank. Secondary sludge passes from the secondary clarifier tank 12 through a sludge discharge conduit 24 provided with a control valve 25 leading to a branch point 26 whence one branch 27 through a control valve 27a leads to the influent end of the aerating tank, while another branch 28 having a control valve 28a in effect leads to the feedwell of the thickener 13.

The secondary effluent conduit 23 has a branch conduit 29 provided with a control valve 30, which leads to a juncture 31 with branch conduit 28 to supply thereto a controllable volume of secondary effluent liquor. A conduit 32 leads from juncture 31 to juncture 33 there to be joined by an auxiliary conduit 34 leading from the aerator tank 11 and provided with a control valve 35 to supply a controllable volume of aerobically treated sewage to the thickener station 13. That is to say, a conduit 36 leads from juncture 33 to a juncture 37 to be joined by the primary underflow conduit 19. Mixed sludge then feeds into the thickener 13. A feed conduit 38 leading from juncture 37 supplies mixed sludge to the feedwell of thickener 13; that is to say, there is thus supplied to the thickener 13 a mixture of primary and secondary sludge along with a controlled proportion of secondary liquor.

The confluence of primary and secondary sludges at juncture 37 may be in a pre-mixing tank which may be provided with a suitable kind of mixing means such as mechanical mixing or compressed air.

A return conduit 39 with control valve 39a leads from the effluent launder of the thickener 13 to and into the raw sewage influent conduit 18 feeding the primary clarifier 10. There is also shown to be provided a conduit 39b having a control valve 39c, for optionally discharging effluent from the thickener 13 to waste rather than returning it for retreatment either to the primary clarifier or to the secondary treatment system.

A by-pass conduit 40 with control valve 41 is shown to lead from a branch point 43 of auxiliary conduit 34, so that a portion of aerated sewage may be selectively drawn either directly from a point of the tank 11 itself or else from the effluent thereof.

Thickened sludge from the thickener 13 passes through a conduit 44 provided with control valve 45 so that thickened raw sludge may pass to a closed digester tank 46 having a discharge conduit 47 for the withdrawal of partially digested sludge, provided with a control valve 48. This partially digested sludge is transferred to a residual gas extraction station where the digestion is completed as in residual digestor shown in FIGS. 4 and 7 further to be described. The digester 46 has means for gas take-off and sludge heating. The gasifiable matter is maintained in a state of uniform distribution throughout the contents of the tank, as is indicated by curved arrows "A" in digester 46. Suitable mixing means are employed for forcibly maintaining the tank contents in such a state of distribution that the discharging sludge will be representative of the tank contents.

Thickened sludge from the sludge bed reservoir in tank 13 is transferred to the digester 46 as indicated by a motor driven sludge transfer pump P in combination with a time clock device K. The time clock device may comprise means for automatically starting the pump at predetermined frequencies, and to keep it running for predetermined periods of time.

For alternate or temporary disposal of thickened sludge from thickener 13 there is provided an auxiliary discharge connection 13c with control valve 13d.

The invention is not limited to the example of the sewage treatment plant shown in FIGURE 1, with respect to the manner in which the dilute sludges are derived. That is to say, the dilute sludges to be subjected to the "High-Rate" digestion of this invention following their specially controlled thickening treatment, may be derived from the physical, chemical, or biological treatment of the raw sewage or any suitable combination thereof. For example, the dilute sludge may be derived from primary sedimentation treatment alone, or from sedimentation treatment coupled with chemical treatment; or it may be derived as a mixture of primary sedimentation sludge and sludge from trickling filters and its modifications; or it may be derived from biological treatment of raw sewage, where no primary sedimentation is employed, but where the raw sewage is subjected to aeration treatment followed by clarification, and where the sludge from this clarification represents the sludge to be treated in accordance with this invention.

The raw sludge thickening operation as carried out in thickener 13 (FIG. 1) according to the aforementioned Torpey Patent No. 2,850,449, is of special significance for this invention for the reason that it eliminated the problem of producing supernatant liquor of conventional two-stage digestion operation. An outline of the specially controlled thickening operation is given below in this specification.

Having eliminated the problem of supernatant liquor of conventional two-stage digestion operation outlined above, this invention carries the digestion operation forward into a new range of high sludge loading rates made possible by increased rates of conversion of solids to gas. Such high loading ranges were discovered to be feasible and arrived at by measuring both the velocity as well as the proportion of gasifiable matter converted while increasing the loading rate until biological failure occurred, meanwhile supplying thickened raw feed sludge to the digester at frequent intervals, and forcibly maintaining the gasifiable matter in the tank contents in a state of uniform distribution.

In pursuance of the objects of this invention the process must be conceived as substantially continuous in the sense that the feed rate into the digester is substantially equal to the discharge from the digester, while the contents are kept in a state of uniform distribution. In this state ungasified material will be displaced continuously with the discharge, herein termed the gas loss.

In determining digestion efficiency for the purpose of this invention, the following factors must be considered namely that the "gas produced" is the difference between the "potentially producible gas" and the "gas lost" in the discharging sludge. These three factors are here to be considered in relation to a fourth factor, namely potentially producible gas contained in the sludge held in the tank, herein termed "producible gas held."

This interrelationship of the four factors bearing on digestion efficiency can be presented in the following simple scheme.

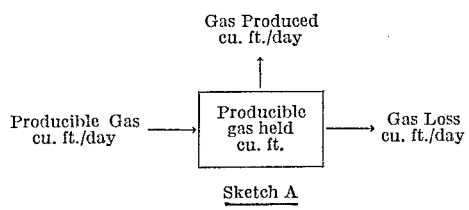

Sketch A

In this way, the velocity or rate of conversion of solids to gas is definable by the ratio of the rate of digester gas production to the amount of potentially gasifiable matter held, as expressed by the Digestion Index defined below.

A practical mode of determining these four interrelated factors is as follows:

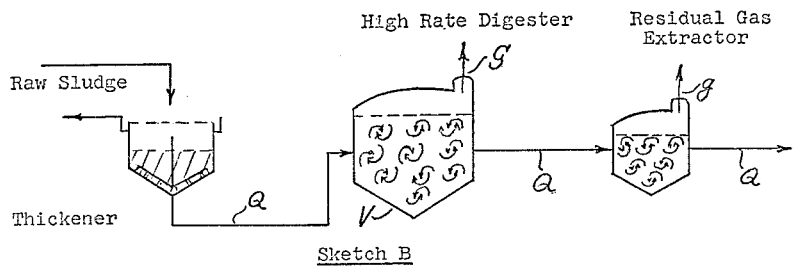

Sketch B $Q$ = thickened raw sludge feed in cu. ft./day.
$V$ = volume of the digester in cu. ft.
$G$ = gas produced in degister in cu. ft./day.
$g$ = gas produced in residual gas extractor in cu. ft./day.

therefore $$\frac{g}{Q}$$

= gas remaining in one cu. ft. of sludge leaving the high rate digester.

while $$\frac{V \times g}{Q}$$

= the gas producible at any moment in the entire contents of the high rate digester.

Further, $$\frac{G}{\frac{V \times g}{Q}}$$

or $$\frac{GQ}{Vg} \times 100\% \text{ per day}$$

is the relation of the rate of gas production to the gas producible from the gasifiable material continuously held in the tank.

This relationship is an expression of the velocity of conversion of solids to gas and is here termed the "Digestion Index."

This invention establishes and exploits the actual time required for solids to be converted to gas. In this way the digestion process is oriented towards velocity of biochemical conversion of solids to gas at high loading rates, in radical departure from conventional requirements governed by the supernatant liquor problem and limited as to loading rates.

This invention is substantiated by demonstrating the fact that digestion is practicable in this new high range of loading rates without appreciable loss of gas-producing efficiency, and at minimum tank requirements. Experimentally, in a continuous operation such as illustrated in Sketch B above, this is borne out by the FIGURE 3 curve $K_1$ showing the relationship of the proportional gas loss to digester loading rate in terms of sludge detention time as well as in terms of per capita tank requirements; the gas loss being definable as $$\frac{g}{g+G} \times 100 \text{ in percent}$$

Figure 3:
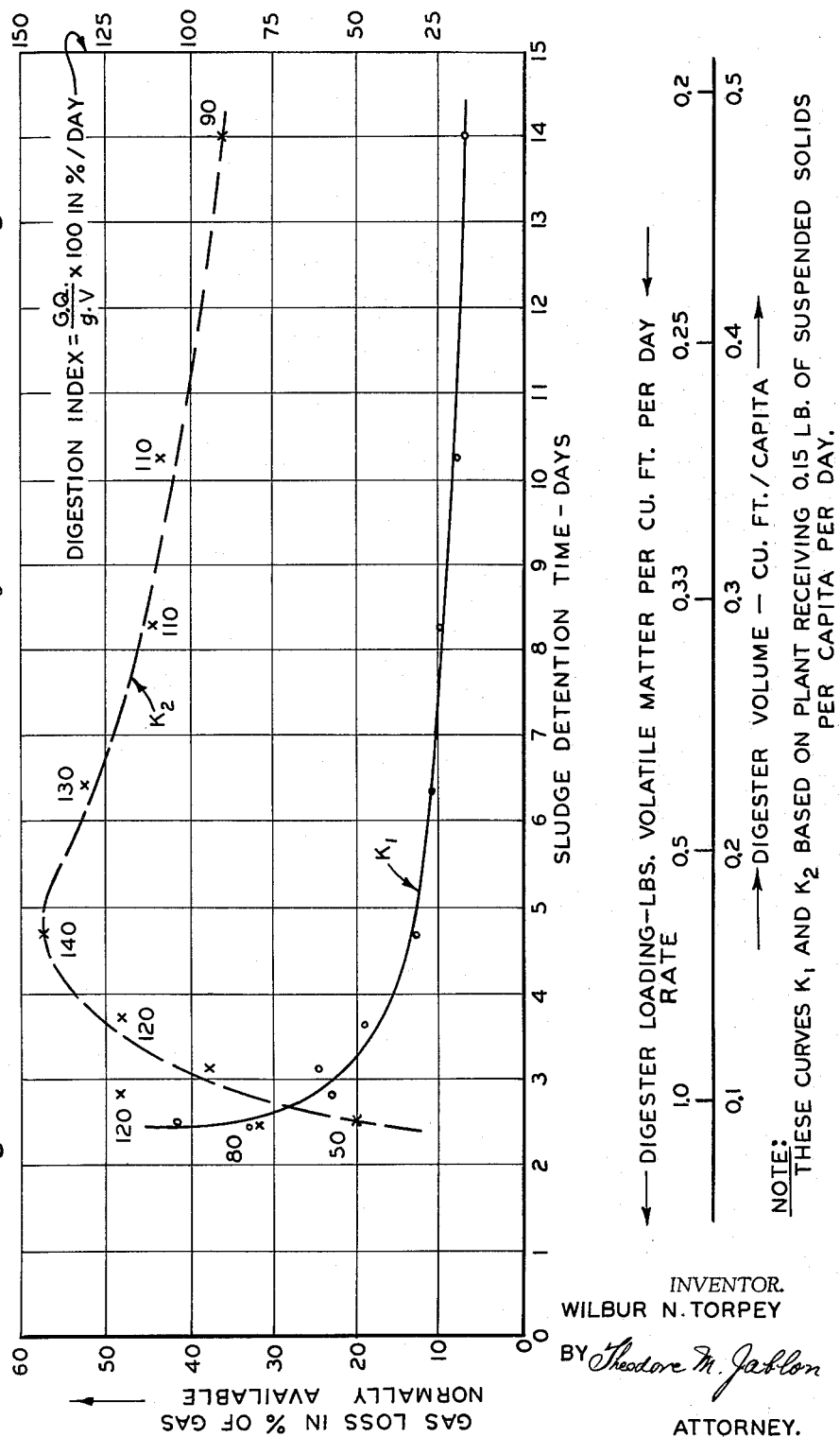
FIGURE 3 is a graph showing digestion efficiency curves pertaining to this invention.

The FIGURE 3 curve $K_1$ was derived from a treatment plant receiving 0.15 lb. of suspended solids/per capita/per day.

The following presents the procedure of converting the dimension of the abscissa, namely loading rate in terms of cu. ft. of digester space required per capita into loading rate expressed as pounds of volatile matter per cu. ft./per day. This conversion is feasible since FIG. 3, according to the legend thereon, refers to a "Plant Receiving 0.15 lb. of Suspended Solids per Cap. per Day." From the data appearing along the abscissa of FIG. 3, the equivalent loading in "pounds of volatile matter per cu. ft. per day" is derived, as follows:

Since FIG. 3 represents the digestion of mixed sludge derived from an activated sludge plant the conversion is made on the customary basis that such a plant will operate at 90% efficiency which means it will remove 90% of the suspended solids in the raw sewage. Furthermore, a generally accepted fact is that sewage solids contains 75% volatile matter.

Consequently, on that basis the conversion can be established as follows:

The solids load per capita received by the plant=.15 lb. per cap. per day.

With 90% removal by primary and secondary treatment of the plant the amount of suspended solids removed per cap. per day=90%×.15=.135. But since this represents the total suspended solids, the volatile solids are 75%×.135=.10 lb. of volatile matter per capita per day.

Therefore, the conversion formula is as follows:

$$\frac{\text{lb. volatile matter/per capita/per day}}{\text{cu. ft./capita}}$$

$$= \frac{\text{lbs. volatile matter}}{\text{capita} \times \text{day}} \times \frac{\text{capita}}{\text{cu. ft.}}$$

$$\frac{\text{lbs. volatile matter}}{\text{cu. ft./day}}$$

and can be tabulated from FIG. 3 as follows:

| Cu. ft./cap. from Fig. 3 | Pounds volatile matter per cap. per day | Loading rate, lbs. vol. matter per cu. ft. per day |
| --- | --- | --- |
| .5 | .1 | $\frac{.1}{.5}$=.2 lb. |
| .4 | .1 | $\frac{.1}{.4}$=.25 lb. |
| .3 | .1 | $\frac{.1}{.3}$=.33 lb. |
| .2 | .1 | $\frac{.1}{.2}$=.5 lb. |
| .1 | .1 | $\frac{.1}{.1}$=1.0 lb. |

Curve $K_1$ in FIG. 3 reveals the unexpected fact that not until 30 to 50 times the conventional loading rate had been imposed, was there encountered a significant loss of gas producing efficiency, although biological balance was still maintainable. For loading rates beyond 50 times the conventional, the curve indicates that sludge was being displaced at a rate too great for the biological forms to convert the solids to gas, likewise bacteria were displaced more rapidly than they could multiply whereby the biological balance was lost.

The corresponding Digestion Index Curve $K_2$ above the gas loss curve $K_1$, indicates that the velocity of conversion or Digestion Index was in fact increased from 90%/day to 140%/day by increasing the loading rate from about .2 to about .6 lb. of volatile matter/cu. ft./day. In this way, it was discovered that stepping up the loading rate in fact forces upwardly the rate of conversion of solids to gas as the loading rates approach biological failure.

The findings of this invention reveal that the bacterial growth rate under the forced loading conditions here contemplated appears to reach its limit when the digestion displacement time is reduced to about 2.5 days, whereby the bacteria are displaced in the discharging sludge at the rate of 40% per day of those present. In fact, this appears to be the reproduction or growth rate limit of those bacteria responsible for gas production under the operating conditions of the FIGURE 3 curves. The digestion process of this invention is oriented towards that limit of bacterial growth rate, while maintaining the aforementioned high digester gas-producing efficiency. Thus, it is seen from the above gas loss curve $K_1$ that, with a loading in the order of .17 cu. ft. per capita, biochemical operating balance is sustainable at a gas loss of only 12%, yet at a maximum of gas producing efficiency corresponding to a peak value of a digestion index of 140% day.

While the invention is aimed at continuously sustaining high gas-producing efficiency at high loading rates, it furthermore takes into consideration the novel concept of separation of bacterial growth from bacterial death for the purpose of conducting each phase with equally high efficiency. This leads to the concept of conducting high efficiency gas production in the highly loaded digester where bacterial growth proceeds at an intensified rate, while separately and efficiently dealing with the residual gasifiable matter contained in the sludge discharging from the high rate digester in a supplemental chamber under similar conditions of uniform distribution of gasifiable matter. That is to say, the residual matter is converted in a separate gas extraction tank under conditions where bacterial death proceeds at a rate corresponding to the logarithmic rate at which the respective residual matter is being exhausted. This condition is representable by a bacterial population curve which falls from a maximum to approach asymptotically the horizontal axis of time. Under the digestion conditions established by this invention it is possible to precisely dimension the gas extraction tank with the greatest economy as to size determined in direct relation to the bacterial death curve. That is to say, the tank size for residual gas extraction is now determinable on a direct biological basis. This manner of residual gas extraction is in contrast with the conditions prevailing in the secondary stage of conventional digestion which is designed and dimensioned for the main purpose of separation of supernatant liquor. That distinction is further accentuated by the fact that the contents of the residual gas extractor are purposely and forcibly kept in substantially homogeneous mixture, while elevated sludge temperatures are maintained to promote rapid and efficient exhaustion of residual gasifiable material.

The biological significance of this combination of high rate digestion with residual gas extraction is graphically shown in FIGURE 4 using Density of Bacterial Population vs. Time to illustrate the respective conditions.

Speaking of the density of bacterial population, as it enters into the concepts of this invention, it may be visualized in terms of their respective rates of gas production. It is with that understanding that the areas of population density in FIGURE 4 are to be construed.

In that diagram, the area $H_1$ of high bacterial population density and high rate of bacterial growth is associated with the high rate digester $H_2$ shown directly below the area $H_1$. The area $D_1$, as defined by the bacterial death curve $D_3$, represents an area of decreasing bacterial population density, which area is here shown to be associated with the residual gas extractor tank $D_2$ shown directly below the area $D_1$.

This extractor tank $D_2$ is shown, by way of example, in the form of a horizontally extending tank partitioned to represent a horizontal sequence of communicating compartments M provided with a common horizontal mixer shaft S. This revolving mixer shaft maintains the contents of all compartments in a state of uniform distribution of gasifiable matter therein.

The functional significance of the gas extractor tank $D_2$ lies in the progress of sludge passing sequentially through this series of compartments M. In this way, the time and extent of residual gas extraction is a function of the horizontal length of this tank. From the diagram it can therefore be seen that a sludge product of a desired degree of degasification is obtainable as indicated for instance by a point P on the bacterial death curve $D_3$ corresponding to a portion of the horizontal length of the gas extractor tank $D_2$.

In this way, there is made possible the most efficient exhaustion of the residual gasifiable matter in terms of tank and time requirements. The degree of gas extraction defining the quality of the sludge product is indicated by the gas production curve E shown to be associated with the horizontal gas extraction tank appearing as the abscissa.

The high rate digestion system of this invention affords a spectacular saving in construction and other costs, as represented in FIGURE 5 showing a diagrammatic comparison of tank size requirements of the new system as against the conventional.

The conventional two-stage digestion system comprises a primary tank $U_1$ and a secondary tank $U_2$ each providing a capacity equivalent to 2.5 cu. ft. per capita of connected population. The primary stage would normally produce 90% of the available gas while about 80% of the remaining gas is produced by the secondary tank $U_2$ coincidental with the production of digester supernatant liquor indicated by the zone $U_3$. By contrast, "HighRate" digestion comprises for example a high rate digestion tank $V_1$ having a capacity of .5 cu. ft./capita followed by a residual gas extractor tank $V_2$ providing for example, a capacity of .2 cu. ft./capita making an overall digester capacity requirement of .7 cu. ft./capita. The high rate digester tank $V_1$ is preceded by a thickening tank $V_3$ in which dilute raw sludge is concentrated in the manner of the aforementioned Torpey Patent No. 2,850,449 and furthermore discussed below. The thickening tank $V_3$ represents a tank requirement in the order of .15 cu. ft./capita which added to the capacity requirements of $V_1$ and $V_2$ provides a total tank capacity requirement of only .85 cu. ft./capita for the high rate digestion system shown in FIGURE 5.

Both tanks $V_1$ and $V_2$ of this high rate digestion system have indicated in them by way of curved arrows $W_1$ and $W_2$ respectively a state of uniform distribution of gasifiable matter throughout the tank contents. Tank $V_1$ under the high loading rates herein contemplated will produce about 90% of the available gas under constant forced bacterial growth conditions as represented by the area $H_1$ of FIGURE 4. The sludge transferred from tank $V_1$ to tank $V_2$ will yield about 80% of the residual gas under conditions corresponding to the area $D_1$ in FIGURE 4 of decreasing bacterial population density. The net result of the operation of tanks $V_1$ and $V_2$ is a digested sludge product substantially equivalent both as to volume and degasification to that obtainable from the conventional two-stage digestion systems.

FIGURE 5 thus illustrates that with only a small but specially controlled thickening tank $V_3$ to provide the reservoir of raw feed sludge, both the high rate digester tank $V_1$ and the residual gas extractor tank $V_2$ can be operated at highest gas producing efficiency in the absence of digester supernatant liquor. Heat losses of the highly loaded tanks $V_1$ and $V_2$ are thus greatly reduced without significant temperature differential between the contents of tanks $V_1$ and $V_2$. In this way, the residual gas extractor tank $V_2$ is operable at a relatively high temperature level.

As a result of this invention there was thus attainable savings in the order of 80% of conventional tank requirements. Indeed a saving in this order was found to be practical and to be safely sustainable in the operation of a sewage treatment plant serving 350,000 people.

As has been indicated, this invention must also be viewed with respect to improvements in overall plant efficiency made possible thereby. That aspect of the invention clearly presents itself in FIGURE 6 by way of a simplified diagrammatic rendition of the FIGURE 1 plant flowsheet, with the addition of the residual gas extraction station.

The FIGURE 6 flowsheet is shown to comprise a primary clarifier tank 100, an activated sludge treatment station 101, a secondary clarifier tank 102, a sludge thickener 103, a high rate digester tank 104, and a residual gas extractor tank 105.

The FIGURE 6 flowsheet draws attention to the improvements in overall plant treatment effects, whereby in addition to a high grade digested sludge product $F_1$, there are obtained high grade primary clarifier effluent $F_2$, as well as high grade secondary clarifier effluent $F_3$. That is to say, the combined thickening and digestion operation of this invention importantly benefits the operation and efficiency of the primary as well as of the secondary clarification steps, in that it significantly reduces the load of recirculating liquors on the treatment system.

Reverting to the arrangement of FIGURE 4 there will now be described a detailed implementation thereof, and particularly of the horizontally extending elongated residual gas extraction tank, as illustrated in FIGURES 7 to 11.

In FIGURE 7 we find the main or high rate digester tank 106 having the conical bottom, and a pump 107 circulating the sludge from the tank bottom through an outside pipe 108 and through a heater 109 back to raw sludge inlet 110. Gas withdrawal is indicated at 111, with the sludge in the tank as before subjected to enforced agitation whereby the body of sludge in the tank is kept substantially homogeneously mixed. The sludge being fed to this digester tank causes volumetric displacement through overflow pipe 112 into overflow box 113 from which the transfer sludge enters the residual gas extraction station 114 represented by a horizontally elongated closed tank structure 115 having a sludge inlet connection 116 with gas and grit trap 116a, a sludge outlet connection 117 with gas trap 117a, and transverse partition walls 118 dividing the tank structure into a horizontal sequence of digestion chambers 119. Transfer conduits or by-pass means 122, 123 and 124 at the bottom of the tank allow the sludge to pass from one digestion chamber to the next, without short-circuiting, thus insuring that the sludge will be held in the residual gas extraction station substantially for the duration of the rated detention time.

Referring now jointly to FIGURES 7, 8, 9 this residual gas extraction tank has agitating means for keeping the digesting sludge substantially uniformly mixed, which comprises an agitator shaft 125 extending from end to end of the tank and through the partition walls 118, and having agitator members 126 mounted thereon in each of the digestion chambers. The partition walls in this embodiment allow for gas passages 118a so as to provide a gas collection space 127 common to all the digestion chambers, with a gas withdrawal conduit indicated at 127a. A motor 128 drives the agitator shaft.

According to the enlarged showing in FIGURE 8, the tank structure 115 comprises modular members in the form of individual trough-shaped sections 129 with the end flanges 130 thereof bolted together but with a spaced strip member 131 interposed. This kind of endwise connection between the tank section provides a U-shaped inwardly open transverse groove 132 between the sections for the insertion therein of a transverse partition wall or plate. In this embodiment, the partition walls are horizontally split at 133 (see FIG. 9), thus comprising a lower plate member 134 and an upper plate member 135 abutting with one another along a horizontal line, and providing between them an opening fitted around the agitator shaft. The shaft has respective end bearings 136 and 137 removably mounted on respective end walls 138 and 139 of the tank structure. Endwise abutting top plates 140 provide the tank cover sealingly connected to the peripheral top flanges 141 of the composite trough shaped body portion of the tank as well as to transverse flanges 141a formed at the top end of the partition walls 118. A modified end bearing arrangement for the shaft is illustrated in the further detail of FIGURE 11, wherein a bearing 140a for the shaft is spaced outwardly from the end wall of the tank, and a separate shaft sealing device 140b is provided effective between the end wall and the shaft, including the rubber seal ring 140c.

Flow communication between respective mutually adjacent digestion chambers in the residual gas extraction tank is in a form of a sequence of transfer conduits located underneath the tank bottom, each by-passing a respective partition wall and preferably including a trap 142 for intercepting grit or the like from the sludge transferring from one digestion chamber to the next.

As herein exemplified, the grit traps 142 located underneath the tank at the respective partition walls, have an inlet connection 143 with the tank at the upstream side of the respective partition walls, and an outlet connection 144 with the tank at the downstream side of the wall. A drain valve 145 for grit discharge is shown at the bottom of the trap, whereas interposed valves 146 and 147 are shown respectively in the connections 143 and 144, operable to close these connections to enable the traps to be inspected or the like.

In the operation of this residual gas extraction tank, should, for example, the first sludge transfer conduit or trap 142 become blocked as by excessive accumulation of grit or the like, then the sludge level in the first digestion chamber may rise from the normal elevation "E" to the overflow weir edge 118b until the condition is corrected. However, any developing condition of this kind may be signalled by suitable alarm means or level indicating devices such as here indicated by the float device 148, even before the sludge reaches the level at which it actually will overflow into the adjoining chamber, so that the condition may be brought back to normal by attention to the trap.

Furthermore, in the operation of this gas extraction tank, a high digestion efficiency is continuously maintainable not only by the effective mixing operation in the respective digestion chambers, but also by maintaining the sludge at an elevated temperature. For example, while the sludge may enter the residual gas extraction tank from the digester already substantially hotter than the ambient temperature, any heat losses can be compensated for by the introduction of live steam into the sludge in the respective digestion chambers. Means to that end are indicated by a steam header 149 having valved control branch pipes 150 delivering steam directly into the sludge bodies of the respective digestion chambers where it gives up its latent heat by condensation. Alternatively, a system of pipes carrying a suitable heating medium such as hot water or steam may be applied to the outside faces of the tank walls, shielded outwardly against heat loss by a suitable blanket of insulating material. Again, if the sludge entering the tank is of itself sufficiently hot, a mere insulation of the outside of the tank may suffice for maintaining a temperature condition favorable for anaerobic bacterial action which converts the residual organic matter into gas.

The modified arrangement of the residual gas extraction tank in FIGURE 10 is self-explanatory, featuring a twin agitator shaft arrangement provided in a relatively wider tank, with the parallel shafts 151 and 152 which may be rotated in directions opposite to one another, thus further intensifying the mixing of the digesting sludge.

There will now be outlined the raw sludge thickening operation to be conducted in thickener 13 of FIGURE 1 for providing a raw sludge feed of the required solids concentration to operate the high rate digester 46 in accordance with the teachings of this invention.

This thickening operation according to the aforementioned Torpey Patent No. 2,850,449 involves a procedure for rapidly concentrating putrescible raw sludge while producing a thickener effluent of high quality. This thickening operation is conducted to establish and maintain a sludge bed providing a reservoir of sludge sufficiently concentrated to meet the digestion requirements of this invention. This thickening operation requires controlling the depth of the sludge bed to the end of controlling the solids detention time therein while also controlling the solids loading rate and liquid loading rate. As is set forth in that patent the solids detention time is relatively measurable and is definable by the relationship of the sludge volume held in the sludge bed to the rate at which thickened sludge is withdrawn. This measure of the solids detention time is therein termed the "Sludge Volume Ratio" conveniently abbreviated S.V.R. The control of this thickening operation is governed by the thickening characteristics of the respective sludges as shown, for example, in the Sludge Thickening Behavior Curves of FIGURE 2, showing the thickened sludge concentration as a function of the relative detention time of the solids in the bed.

Figure 2:
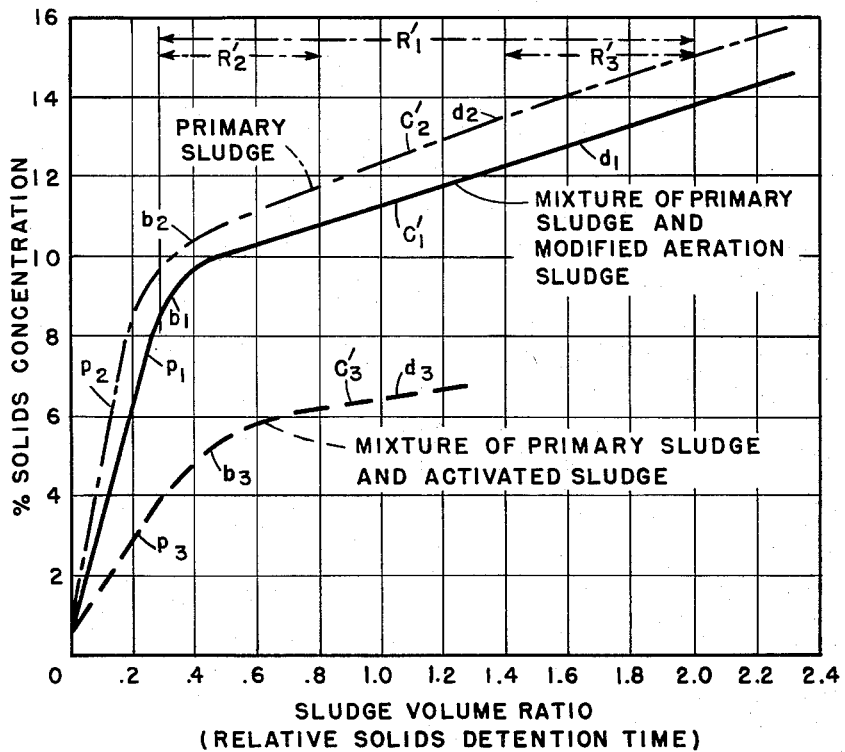
FIGURE 2 shows curves pertaining to the operation of the thickening station.

This FIGURE 2 shows the thickening behavior curves for three representative types of sludges, namely curve $C_1'$ for a mixture of primary and modified aeration sludge, curve $C_2'$ for primary sludge alone, and curve $C_3'$ for a mixture of primary and conventional activated sludge.

The following Table A presents operating ranges for the thickening of the three representative types of sludges applicable to substantially average and normal conditions with respect to sludge characteristics and sludge temperature.

TABLE A

|  | Primary Clarification Treatment | Primary Clarification followed by High Rate Secondary Treatment | Primary Clarification followed by Conventional Secondary Treatment |
| --- | --- | --- | --- |
| Concentration of Thickened Sludge, Percent Solids | 8-15 | 7-14 | 4-9 |
| Solids Loading Rate, lbs./sq. ft./day | 10-40 | 8-35 | 4-20 |
| Liquid Loading Rate, gal./sq. ft./day | 500-1,500 | 500-1,500 | 250-1,000 |
| Relative Solids Detention Time measured by Sludge Volume Ratio | ¼-2 | ¼-2 | ½-3 |
| Sludge Bed Depth in ft | 1-5 | 1-5 | 1-5 |

In the operation of the invention it is to be noted that the raw sludge solids concentrations of the thickened sludges entering the digestion system will have attained a range of values due to the aforementioned controlled thickening process which eliminates the formation of the supernatant liquor. Practical ranges of solids concentrations thus attainable comprise a range of about 8–15% for primary sludge, 7–14% for combined primary and high rate secondary treatment sludges, and 4 to 9% for combined primary and conventional secondary treatment sludges, all as indicated in the foregoing Table A.

The following Table B presents operating ranges for the high rate digestion of the three representative types of sludges aforementioned and described.

TABLE B

*High rate digestion of three representative types of sludge*

|  | Primary Sludge | Primary plus High Rate Secondary Sludge | Primary plus Conventional Activated Sludge |
| --- | --- | --- | --- |
| Digester Feed Concentration, Percent Solids | 8-15 | 7-14 | 4-9 |
| Digester Loading Rates Expressed in terms of: |  |  |  |
| A. Cu. ft. per capita | 0.1-0.5 | .24-0.8 | 0.20-1.3 |
| B. Pounds of volatile matter per cu. ft. of tank per day | 0.1-0.5 | 0.1-0.5 | 0.1-0.7 |
| High Rate Digestion Efficiency in terms of percent gas generated of that normally available at above digester loading rates | 93-97 | 91-97 | 88-96 |
| Total Digestion efficiency including the residual gas extraction in terms of gas generated in percent of that normally available | 98-99 | 98-99 | 95-99 |

In summary the process of this invention differs in its basic concept from present day practice, inasmuch as it avoids the limitations imposed by the necessity of having to produce digester supernatant liquor capable of being retreated. It is part of this process to shrink the raw sludge to a volume substantially equivalent to the volume of digested sludge that would result from the operation of the aforementioned conventional digestion system after the removal of supernatant liquor. Raw sludge of such high solids concentration is transferred to the digester at high loading rates while the gasifiable matter in the digester tank is forcibly maintained in a state of uniform distribution throughout the body of digesting sludge. In this process the digester tank operates in a continuous manner whereby feed sludge displaces from the digester tank a digested sludge substantially representative of the tank contents with respect to the gasifiable matter distributed therein.

The invention involves the discovery that high speeds of conversion of solids to gas are concurrent with high sludge loading rates. The invention utilizes that discovery by applying digester loading rates in a range far higher than heretofore attainable. The upper limit of that new high loading range is equivalent to providing digester capacity of only about .8 cu. ft. per capita as compared with conventional tank requirements of 5.0 cu. ft. per capita.

The upper limit of loading rate is further defined by that limit which corresponds to a maximum velocity of conversion of solids to gas which was discovered to develop at extremely high loading rates. The limit of loading rate is furthermore predicated upon the fact that it must lie short of that rate at which there occurs an abrupt increase in the residual gasifiable matter contained in the digested sludge.

While the operation of the digester is sustained at very high rates of bacterial conversion of solids to gas induced by the high solids loading rates in the feeding of specially concentrated raw sludge, and by the state of uniform distribution in the body of digesting sludge, the subsequent residual gas extraction operation is conducted under forced agitation to effect the rapid exhaustion of the residual gasifiable matter.

More particularly when the partially digested sludge is subjected to residual gas extraction in a horizontal series of communicating digestion stages then a maximum of efficiency in terms of intensified exhaustion of residual material is attained, as the sludge of the highest bacterial concentration is in the presence of the highest concentration of residual gasifiable material. Further the material passing from the discharge end of the residual gas extraction zone will have resided for the full duration of the rated detention time in this zone. Thus, short-circuiting of undigested material to the outlet is thereby prevented.

The invention may be practiced in a range of loading rates from about 0.1 to about 0.7 lb. of volatile solids per cu. ft. of digester volume per day, but in any event short of a peak speed of conversion of solids to gas as illustrated in FIG. 3, so that the incompletely digested sludge delivered from the high rate digester will contain residual undigested gasifiable matter in an amount of from about 5% to about 20% of the gasifiable matter normally available in the raw sludge fed to the digester, which residual mater will be subjected to the aforementioned residual gas extraction.

However, in a preferred mode of operation the high rate digestion of the invention may be advantageously conducted in a digester loading range from about .2 to about .5 lb. of volatile matter per cu. ft. of digester volume per day where the respective gas losses lie in a range from about 7% to about 12% as indicated in curve $K_1$ of FIG. 3. Thus preferred operating range provides maximum economy of digester tank volume requirements along with stability of operation for digesting the concentrated mixture of primary and activated sludge, and is similarly applicable to the other concentrated sludges.

I claim:
1. A method of anaerobic digestion of sewage sludge, which comprises the steps of preparing the sludge to have a concentration in a range of from about 4% to about 15%, sufficient to produce a digested sludge having substantially no supernatant liquor releaseable; maintaining a body of sludge undergoing digestion and producing gas; supplying said prepared sludge substantially continuously to said body of sludge for sustaining said digestion at a high rate of conversion of solids to gas while discharging from said body incompletely digested sludge at a rate whereby the volume of said sludge body remains substantially constant; forcibly mixing the sludge in said body so as to maintain a uniformly mixed mass of sludge undergoing digestion with the discharging sludge containing residual gasifiable matter in uniform distribution substantially representative of the distribution thereof in said body of sludge undergoing digestion; maintaining the supply of said prepared sludge to said body of digestion sludge at a loading rate in a range from about 0.1 to about 0.7 lb. of volatile solids per cubic foot of said body per day but in any event short of a peak speed of conversion of solids to gas, while delivering from said body of sludge incompletely digested sludge containing undigested matter in an amount from about 5% to about 20% of the gasifiable matter contained in said prepared sludge; substantially continuously supplying said incompletely digested sludge to a residual gas extraction zone; forcibly mixing the sludge contained in said gas extraction zone during a sludge detention time sufficient to allow at least a major portion of the residual gasifiable matter to be digested by conversion into gas; and discharging from said gas extraction zone a substantially fully digested sludge at a rate whereby the volume of sludge in said zone remains substantially constant.

2. The method according to claim 1, wherein said sludge fed to the digester is primary clarification sludge concentrated to a solids content in a range of from about 8% to about 15%, and said loading rate is in a range from 0.1 to 0.5 lb. of volatile solids per cu.ft. per day.

3. The method according to claim 1, wherein said sludge fed to the digester is sludge obtained as the mixture of primary clarification sludge and high-rate activated sludge, concentrated to a solids content in a range from about 7% to about 14%, and said loading rate is in a range from about 0.1 to about 0.5 lb. of volatile solids per cu.ft. per day.

4. The method according to claim 1, wherein said sludge fed to the digester is sludge obtained as the mixture of primary clarification sludge and conventional activated sludge, concentrated to a solids content in a range from about 4% to about 9%, and said loading rate is in a range from about 0.1 to about 0.7 lb. of volatile solids per cu.ft. per day.

5. The method according to claim 1, wherein said residual gas extraction is carried out at elevated temperature.

6. The method according to claim 1, wherein the sludge in the gas extraction zone is subjected to residual gas extraction in a plurality of comunicating digestion stages in horizontal series which comprises maintaining in each stage a body of sludge under condtions of forced mixing whereby the gasifiable matter is uniformly distributed in each stage for discharging from the last stage digested sludge substantially free from supernatant liquor by volumetric displacement from stage to stage caused by the discharge from the digester into the receiving station so that the first stage contains the highest bacterial concentration in the presence of the highest concentration of gasifiable material thereby inducing the highest rate of conversion of solids to gas and so on through the sequence of stages until the last stage where the lowest bacterial concentration is in the presence of the lowest concentration of residual gasifiable material, whereby shortcircuiting of gasifiable matter between inlet and outlet of the extraction zone is prevented.

7. The method according to claim 1, wherein the feed sludge supplied to said body undergoing digestion displaces an equivalent volume of incompletely digested sludge discharging from said body.

8. The method according to claim 1, wherein the feed sludge supplied to said body undergoing digestion displaces an equivalent volume of incompletely digested sludge discharging from said body, and wherein said displaced incompletely digested sludge entering said gas extraction zone displaces therefrom an equivalent volume of said substantially digested sludge.

9. The method according to claim 1, wherein said concentration of the sewage sludge prior to digestion is effected by subjecting clarifier sludge to a thickening operation which comprises feeding said clarifier sludge at relatively low concentration to a thickening zone while overflowing supernatant liquor therefrom, and controlling the feed concentration, the liquid loading rate, the solids loading rate, and the solids detention time in said zone so that a bed of thickened sludge is maintainable sufficiently deep to provide a reservoir of sludge of consistently high concentration such as defined above for feeding to said body undergoing digestion, said sludge bed absorbing fluctuations in the feed of clarifier sludge thereto, and providing said reservoir for substantially continuously feeding such concentrated sludge to said body undergoing digestion.

References Cited by the Examiner

UNITED STATES PATENTS

| | | | |
|---|---|---|---|
| 2,777,815 | 1/1957 | Forrest | 210—3 |
| 2,864,672 | 12/1958 | Brooks | 23—259.1 |
| 2,893,957 | 7/1959 | Genter et al. | 210—5 |
| 2,991,983 | 7/1961 | Logan | 259—97 |
| 3,055,502 | 9/1962 | Cunetta | 210—197 |

FOREIGN PATENTS 753,914   8/1956   Great Britain.

OTHER REFERENCES

Morgan: Studies of Accelerated Digestion of Sewage Sludge, Sew. and Ind. Wastes, vol. 26, April 1954, pp. 462–478.

Torpey: High Rate Digestion of Concentrated Primary and Activated Sludge, Sew. and Ind. Wastes, vol. 26, April 1954, pp. 479–496.

Torpey: Loading to Failure of a Pilot High-Rate Digester, Sew. and Ind. Wastes, vol. 27, February 1955, pp. 121–148.

MORRIS O. WOLK, *Primary Examiner.*

M. E. ROGERS, *Assistant Examiner.*